United States Patent [19]
Flaningam et al.

[11] Patent Number: 5,824,632
[45] Date of Patent: Oct. 20, 1998

[54] AZEOTROPES OF DECAMETHYLTETRASILOXANE

[75] Inventors: Ora Ley Flaningam; David Lee Morgan; Dwight Edward Williams, all of Midland, Mich.

[73] Assignee: Dow Corning Corporation, Midland, Mich.

[21] Appl. No.: 791,041

[22] Filed: Jan. 28, 1997

[51] Int. Cl.6 .................................. C11D 7/26; C11D 7/50
[52] U.S. Cl. ........................... 510/411; 134/42; 252/194; 510/177; 510/466; 510/505; 510/506
[58] Field of Search .................................. 510/411, 408, 510/466, 505, 506, 177; 134/42; 252/194

[56] References Cited

U.S. PATENT DOCUMENTS

| | | | |
|---|---|---|---|
| 4,248,724 | 2/1981 | MacIntosh | 252/396 |
| 5,443,747 | 8/1995 | Inada et al. | 510/466 |
| 5,454,970 | 10/1995 | Flaningan | 252/174 |
| 5,454,972 | 10/1995 | Williams | 252/174 |
| 5,456,856 | 10/1995 | Flaningan | 252/174 |
| 5,478,493 | 12/1995 | Flaningan | 252/174 |
| 5,492,647 | 2/1996 | Flaningan | 252/174 |
| 5,501,811 | 3/1996 | Flaningan | 252/174 |
| 5,507,878 | 4/1996 | Flaningan | 134/42 |
| 5,516,450 | 5/1996 | Williams | 252/174 |
| 5,531,814 | 7/1996 | Bahr et al. | 106/3 |
| 5,628,833 | 5/1997 | McCormack et al. | 134/26 |

*Primary Examiner*—Christine Skane
*Attorney, Agent, or Firm*—James L. DeCesare

[57] ABSTRACT

Binary azeotrope and azeotrope-like compositions contain 1-butoxy-2-propanol, 1-(2-methoxy-1-methylethoxy)-2-propanol, 1-(2-ethoxy-1-methylethoxy)-2-propanol, 1-(2-propoxy-1-methylethoxy)-2-propanol, and 1-(2-methoxy-1-methylethoxy)-2-propanol-acetate, with decamethyltetrasiloxane (MDDM), and are useful for cleaning, rinsing, or drying.

4 Claims, No Drawings

AZEOTROPES OF DECAMETHYLTETRASILOXANE

BACKGROUND OF THE INVENTION

This invention is directed to solvents for cleaning, rinsing, and drying, which are binary azeotropes or azeotrope-like compositions, containing a volatile methyl siloxane (VMS).

Azeotropes containing an organosilicon compound as one component are described in numerous patents assigned to the Dow Corning Corporation, Midland, Mich. USA, the same assignee as the present invention.

For example, U.S. Pat. No. 5,454,970 (Oct. 3, 1995) describes azeotropes of octamethyltrisiloxane (MDM) and 2-methyl-1-pentanol, 1-hexanol, 1-butoxy-2-propanol, and ethyl lactate. U.S. Pat. No. 5,454,972 (Oct. 3, 1995) and U.S. Pat. No. 5,516,450 (May 14, 1996) describe azeotropes of MDM and n-propoxypropanol. U.S. Pat. No. 5,456,856 (Oct. 10, 1995) describes azeotrope and azeotrope-like compositions of MDM and 2-butoxyethanol, 2-methylcyclohexanol, and isopropyl lactate. U.S. Pat. No. 5,478,493 (Dec. 26, 1995) describes azeotropes of hexamethyldisiloxane (MM) and 3-methyl-3-pentanol, 2-pentanol, and 1-methoxy-2-propanol. U.S. Pat. No. 5,492,647 (Feb. 20, 1996) describes azeotrope and azeotrope-like compositions of octamethylcyclotetrasiloxane ($D_4$) and butyl lactate, 1-propoxy-2-propanol, 1-butoxy-2-propanol, 1-butoxy-2-ethanol, and 4-methylcyclohexanol. U.S. Pat. No. 5,501,811 (Mar. 26, 1996) and U.S. Pat. No. 5,507,878 (Apr. 16, 1996) describe azeotrope and azeotrope-like compositions of MDM and 1-heptanol, cyclohexanol, and 4-methylcyclohexanol.

However, none of these Dow Corning Corporation patents are directed to azeotropes in which the organosilicon component is decamethyltetrasiloxane.

BRIEF SUMMARY OF THE INVENTION

Our invention relates to new binary azeotropes containing a volatile methyl siloxane, and a glycol ether or a glycol ether acetate. Azeotrope-like compositions were also discovered. The azeotrope and azeotrope-like compositions have utility as environmentally friendly cleaning, rinsing, and drying agents.

As cleaning agents, the compositions can be used to remove contaminants from any surface, but especially in defluxing and precision cleaning, low-pressure vapor degreasing, and vapor phase cleaning. They exhibit unexpected advantages in their enhanced solvency power, and their maintenance of a constant solvency power following evaporation, which can occur during applications involving vapor phase cleaning, distillation, regeneration, and wipe cleaning.

Because the cleaning agent is an azeotrope or an azeotrope-like composition, it has another advantage in being easily recovered and recirculated. Thus, the composition can be separated as a single substance from a contaminated cleaning bath after its use in the cleaning process. By simple distillation, its regeneration is facilitated, so that it can be freshly recirculated.

In addition, these compositions possess an enhanced solvency power compared to the volatile methyl siloxane itself. Yet, the compositions exhibit a mild solvency power, making them useful for cleaning delicate surfaces without harm.

These and other features and objects of our invention will become apparent from a consideration of the detailed description.

DETAILED DESCRIPTION OF THE INVENTION

An azeotrope is a mixture of two or more liquids, the composition of which does not change upon distillation. Thus, a mixture of 95% ethanol and 5% water boils at a lower temperature (78.15° C.) than pure ethanol (78.3° C.) or pure water (100° C.). Such liquid mixtures behave like a single substance in that the vapor produced by partial evaporation of liquid has the same composition as the liquid. Thus, the mixtures distill at a constant temperature without change in composition and cannot be separated by normal distillation.

Azeotropes can exist in systems containing two liquids as binary azeotropes, three liquids as ternary azeotropes, and four liquids as quaternary azeotropes. However, azeotropism is an unpredictable phenomenon and each azeotrope or azeotrope-like composition must be discovered. The unpredictability of azeotrope formation is well documented in U.S. Pat. Nos. 3,085,065, 4,155,865, 4,157,976, 4,994,202, or 5,064,560. One of ordinary skill in the art cannot predict or expect azeotrope formation, even among constitutional isomers (i.e. butyl, isobutyl, sec-butyl, and tert-butyl).

For purposes of our invention, a mixture of two or more components is azeotropic if it vaporizes with no change in the composition of the vapor from the liquid. Specifically, azeotropic includes mixtures that boil without changing composition, and mixtures that evaporate at a temperature below their boiling point without changing composition. Accordingly, an azeotropic composition may include mixtures of two components over a range of proportions where each specific proportion of the two components is azeotropic at a certain temperature but not necessarily at other temperatures.

Azeotropes vaporize with no change in composition. If the applied pressure is above the vapor pressure of the azeotrope, it evaporates without change. If the applied pressure is below the vapor pressure of the azeotrope, it boils or distills without change. The vapor pressure of low boiling azeotropes is higher, and the boiling point is lower, than the individual components. In fact, the azeotropic composition has the lowest boiling point of any composition of its components. Thus, an azeotrope can be obtained by distillation of a mixture whose composition initially departs from that of the azeotrope.

Since only certain combinations of components form azeotropes, the formation of an azeotrope cannot be found without experimental vapor-liquid-equilibria data, that is vapor and liquid compositions at constant total pressure or temperature, for various mixtures of the components. The composition of some azeotropes is invariant to temperature, but in many cases, the azeotropic composition shifts with temperature. As a function of temperature, the azeotropic composition can be determined from high quality vapor-liquid-equilibria data at a given temperature. Commercial software such as ASPENPLUS®, a program of Aspen Technology, Inc., Cambridge, Mass., is available to assist one in doing the statistical analysis necessary to make such determinations. Given our experimental data, programs such as ASPENPLUS® can calculate parameters from which complete tables of composition and vapor pressure are generated. This allows one to determine where a true azeotropic composition is located.

The art also recognizes the existence of azeotrope-like compositions. For purposes of our invention, azeotrope-like means a composition that behaves like an azeotrope. Thus, azeotrope-like compositions have constant boiling characteristics, or have a tendency not to fractionate upon boiling or evaporation. In an azeotrope-like mixture, the composition of the vapor formed during boiling or evaporation is identical or substantially identical to the composition of the original liquid. During boiling or evaporation, the liquid changes only minimally, or to a negligible extent, if it changes at all. In other words, it has about the same composition in vapor phase as in liquid phase when employed at reflux. In contrast, the liquid composition of non-azeotrope-like mixtures change to a substantial degree during boiling or evaporation. By definition, azeotrope-like compositions include all ratios of the azeotropic components boiling within one °C. of the minimum boiling point at 760 Torr.

The VMS component of our azeotrope and azeotrope-like composition is decamethyltetrasiloxane $(CH_3)_3SiO[(CH_3)_2SiO]_2Si(CH_3)_3$. It has a viscosity of 1.5 mm²s (centistokes) at 25° C., and is often referred to in the literature as "MDDM" since it contains two difunctional "D" units $(CH_3)_2SiO_{2/2}$ and two monofunctional "M" units $(CH_3)_3SiO_{1/2}$. The structure of MDDM is shown in the formula:

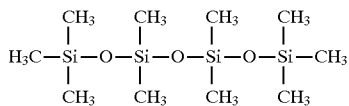

The other components of our azeotrope and azeotrope-like compositions are (i) 1-butoxy-2-propanol $CH_3CH_2CH_2CH_2OCH_2C(OH)CH_3$ a propylene glycol ether sold under the trademark DOWANOL® PnB as propylene glycol n-butyl ether by The Dow Chemical Company, Midland, Mich.; (ii) 1-(2-methoxy-1-methylethoxy)-2-propanol $CH_3OCH_2CH(CH_3)OCH_2CH(OH)CH_3$ a di(propylene) glycol ether sold under the trademark DOWANOL® DPM as di(propylene glycol) methyl ether by The Dow Chemical Company, Midland, Mich.; (iii) 1-(2-ethoxy-1-methylethoxy)-2-propanol $CH_3CH_2OCH_2CH(CH_3)OCH_2CH(OH)CH_3$ a di(propylene) glycol ether sold commercially as ethoxy propoxy propanol by BP Chemical Limited, London, England; (iv) 1-(2-propoxy-1-methylethoxy)-2-propanol $CH_3CH_2CH_2OCH_2CH(CH_3)OCH_2CH(OH)CH_3$ a di (propylene) glycol ether sold under the trademark DOWANOL® DPnP as di(propylene glycol) n-propyl ether by The Dow Chemical Company, Midland, Mich.; and (v) 1-(2-methoxy-1-methylethoxy)-2-propanol-acetate $CH_3OCH_2CH(CH_3)OCH_2CH(CH_3)OC(O)CH_3$ a di (propylene) glycol ether acetate sold under the trademark DOWANOL® DPMA as di(propylene glycol) methyl ether acetate.

It should be noted that the commercially available di(propylene glycol) ethers and di(propylene glycol) ether acetate noted above, may also contain minor amounts of tail-to-head isomers. However, in each case, azeotropes of the minor isomer were indistinguishable from azeotropes of the major isomer in the commercial materials.

Thus, the propylene glycol units —OCHCH₃CH₂O— may be oriented either in a head-to-tail manner (as in the major isomer) with the propylene glycol methyl group being farther from the ether moiety, or in a tail-to-head manner (as in the minor isomer) with the propylene glycol methyl group being closer to the ether moiety.

The boiling points of these liquids in °C. measured at standard barometric pressure (760 Torr) are 194.2° for MDDM; 170.8° for 1-butoxy-2-propanol; 188° for 1-(2-methoxy-1-methylethoxy)-2-propanol; 196.7° for 1-(2-ethoxy-1-methylethoxy)-2-propanol; 212.5° for 1-(2-propoxy-1-methylethoxy)-2-propanol; and 209.1° for 1-(2-methoxy-1-methylethoxy)-2-propanol-acetate.

New binary azeotropes were discovered containing (i) 2–15% by weight MDDM and 85–98% by weight 1-butoxy-2-propanol; (ii) 56–64% by weight MDDM and 36–44% by weight 1-(2-methoxy-1-methylethoxy)-2-propanol; (iii) 65–88% by weight MDDM and 12–35% by weight 1-(2-ethoxy-1-methylethoxy)-2-propanol; (iv) 90–98% by weight MDDM and 2–10% by weight 1-(2-propoxy-1-methylethoxy)-2-propanol; and (v) 88–99% by weight MDDM and 1–12% by weight 1-(2-methoxy-1-methylethoxy)-2-propanol-acetate.

These compositions were homogeneous and had a single liquid phase at the azeotropic temperature and at room temperature. Homogeneous azeotropes are more desirable than heterogeneous azeotropes especially for cleaning, because homogeneous azeotropes exist as one liquid phase instead of two. In contrast, each phase of a heterogeneous azeotrope differs in cleaning power. Therefore, cleaning performance of a heterogeneous azeotrope is difficult to reproduce, because it depends on consistent mixing of the phases. Single phase (homogeneous) azeotropes are also more useful than multi-phase (heterogeneous) azeotropes since they can be transferred between locations with facility.

Each homogeneous azeotrope we discovered existed over a particular temperature range. Within that range, the azeotropic composition shifted with temperature. The following example illustrates our invention in more detail.

EXAMPLE I

We used a single-plate distillation apparatus for measuring vapor-liquid-equilibria. The liquid mixture was boiled and the vapor condensed in a small receiver. The receiver had an overflow path for recirculation to the boiling liquid. When equilibrium was established, samples of boiling liquid and condensed vapor were separately removed, and quantitatively analyzed by gas chromatography. The temperature, ambient pressure, and liquid-vapor compositions, were measured at several different initial composition points. This data was used to determine if an azeotrope or azeotrope-like composition existed. The composition at different temperatures was determined using our data in an ASPENPLUS® software program which performed a statistical analysis of the data. Our new azeotropes are shown in Tables I–V. In the tables, WEIGHT % MDDM is weight percent decamethyltetrasiloxane in the azeotrope. VP is vapor pressure in Torr units (1 Torr≈0.133 kPa≈1 mm Hg). Accuracy in determining these compositions was ±2% by weight.

TABLE I

| GLYCOL ETHER | TEMPERATURE °C. | VP (Torr) | WEIGHT % MDDM |
|---|---|---|---|
| 1-butoxy-2-propanol | 180.7 | 1000 | 15 |
| | 170.4 | 760 | 15 |
| | 150 | 420 | 13 |
| | 125 | 185 | 11 |
| | 100 | 71.2 | 9 |
| | 75 | 23.1 | 7 |
| | 50 | 6.0 | 5 |
| | 25 | 1.2 | 2 |

TABLE II

| GLYCOL ETHER | TEMPERATURE °C. | VP (Torr) | WEIGHT % MDDM |
|---|---|---|---|
| 1-(2-methoxy-1-methylethoxy)-2-propanol | 190.4 | 1000 | 60 |
|  | 180.2 | 760 | 61 |
|  | 150 | 310 | 63 |
|  | 125 | 131 | 64 |
|  | 100 | 48.4 | 64 |
|  | 75 | 15 | 64 |
|  | 50 | 3.7 | 62 |
|  | 25 | 0.71 | 60 |
|  | 0 | 0.09 | 56 |

TABLE III

| GLYCOL ETHER | TEMPERATURE °C. | VP (Torr) | WEIGHT % MDDM |
|---|---|---|---|
| 1-(2-ethoxy-1-methylethoxy)-2-propanol | 197.2 | 1000 | 65 |
|  | 186.7 | 760 | 66 |
|  | 175 | 550 | 67 |
|  | 150 | 257 | 70 |
|  | 125 | 107 | 72 |
|  | 100 | 38.3 | 75 |
|  | 75 | 11.4 | 78 |
|  | 50 | 2.7 | 80 |
|  | 25 | 0.47 | 84 |
|  | 0 | 0.06 | 88 |

TABLE IV

| GLYCOL ETHER | TEMPERATURE °C. | VP (Torr) | WEIGHT % MDDM |
|---|---|---|---|
| 1-(2-propoxy-1-methylethoxy)-2-propanol | 205 | 1000 | 90 |
|  | 193.8 | 760 | 91 |
|  | 175 | 464 | 94 |
|  | 150 | 221 | 98 |

TABLE V

| GLYCOL ETHER ACETATE | TEMPERATURE °C. | VP (Torr) | WEIGHT % MDDM |
|---|---|---|---|
| 1-(2-methoxy-1-methylethoxy)-2-propanol-acetate | 204.5 | 1000 | 88 |
|  | 193.4 | 760 | 89 |
|  | 175 | 467 | 91 |
|  | 150 | 222 | 94 |
|  | 125 | 94 | 97 |
|  | 100 | 34.3 | 99 |

The tables show that at different temperatures, the composition of a given azeotrope varies. Thus, an azeotrope represents a variable composition which depends on temperature.

We also discovered azeotrope-like compositions containing MDDM and 1-butoxy-2-propanol, 1-(2-methoxy-1-methylethoxy)-2-propanol, 1-(2-ethoxy-1-methylethoxy)-2-propanol, 1-(2-propoxy-1-methylethoxy)-2-propanol, and 1-(2-methoxy-1-methylethoxy)-2-propanol-acetate.

For example, azeotrope-like compositions of MDDM and 1-butoxy-2-propanol were found at 760 Torr vapor pressure for all ratios of the components, where the weight percent 1-butoxy-2-propanol varied between 57–99% and the weight percent MDDM varied between 1–43%. These azeotrope-like compositions had a normal boiling point (the boiling point at 760 Torr) that was within one °C. of 170.4° C., which is the normal boiling point of the azeotrope itself.

Azeotrope-like compositions of MDDM and 1-(2-methoxy-1-methylethoxy)-2-propanol, 1-(2-ethoxy-1-methylethoxy)-2-propanol, 1-(2-propoxy-1-methylethoxy)-2-propanol, and 1-(2-methoxy-1-methylethoxy)-2-propanol-acetate, were also found at 760 Torr vapor pressure for all ratios of the components, where the weight percent 1-(2-methoxy-1-methylethoxy)-2-propanol, 1-(2-ethoxy-1-methylethoxy)-2-propanol, 1-(2-propoxy-1-methylethoxy)-2-propanol, and 1-(2-methoxy-1-methylethoxy)-2-propanol-acetate, varied as shown in Table VI. These azeotrope-like compositions also had a normal boiling point (the boiling point at 760 Torr) that was within one °C. of the normal boiling point of the azeotrope itself.

TABLE VI

AZEOTROPE-LIKE

| GLYCOL ETHER/ GLYCOL ETHER ACETATE | TEMP °C. | VP Torr | WEIGHT % MDDM | WEIGHT % GLYCOL |
|---|---|---|---|---|
| 1-butoxy-2-propanol | 170.4–171.4 | 760 | 1–43 | 57–99 |
| 1-(2-methoxy-1-methylethoxy)-2-propanol | 180.2–181.2 | 760 | 37–79 | 21–63 |
| 1-(2-ethoxy-1-methylethoxy)-2-propanol | 186.7–187.7 | 760 | 43–83 | 17–57 |
| 1-(2-propoxy-1-methylethoxy)-2-propanol | 193.8–194.8 | 760 | 75–99 | 1–25 |
| 1-(2-methoxy-1-methylethoxy)-2-propanol-acetate | 193.4–194.4 | 760 | 71–99 | 1–29 |

The procedure for determining these azeotrope-like compositions was the same as Example I. The azeotrope-like compositions were homogeneous and have the same utility as their azeotropes.

An especially useful application of our azeotrope and azeotrope-like composition is cleaning and removing fluxes used in mounting and soldering electronic parts on printed circuit boards. Solder is often used in making mechanical, electromechanical, or electronic connections. In making electronic connections, components are attached to conductor paths of printed wiring assemblies by wave, reflow, or manual soldering. The solder is usually a tin-lead alloy used with a rosin-based flux. Fluxes containing rosin, a complex mixture of isomeric acids principally abietic acid, often contain activators such as amine hydrohalides and organic acids. The flux (i) reacts with and removes surface compounds such as oxides, (ii) reduces the surface tension of the molten solder alloy, and (iii) prevents oxidation during the heating cycle by providing a surface blanket to the base metal and solder alloy.

After the soldering operation, it is usually necessary to clean the assembly. The compositions of our invention are useful as cleaners. They remove corrosive flux residues formed on areas unprotected by the flux during soldering, or residues which could cause malfunctioning and short circuiting of electronic assemblies. In this application, our compositions can be used as cold cleaners, vapor degreasers, or ultrasonically. The compositions can also be used to remove carbonaceous materials from the surface of these and other industrial articles. By carbonaceous is meant any carbon containing compound or mixture of carbon containing compounds soluble in common organic solvents such as hexane, toluene, or trichloroethane.

We selected seven azeotropic compositions for cleaning a rosin-based solder flux as soil. Cleaning tests were conducted at 22° C. in an open bath with no distillation recycle of the composition. The compositions contained 85% 1-butoxy-2-propanol, 39% 1-(2-methoxy-1-methylethoxy)-2-propanol, 40% 1-(2-methoxy-1-methylethoxy)-2-propanol, 16% 1-(2-ethoxy-1-methylethoxy)-2-propanol, 34% 1-(2-ethoxy-1-methylethoxy)-2-propanol, 9% 1-(2-propoxy-1-methylethoxy)-2-propanol, and 11% 1-(2-methoxy-1-methylethoxy)-2-propanol-acetate. They all removed flux although all were not equally effective. The following example further illustrates our invention.

EXAMPLE II

We used an activated rosin-based solder flux commonly used for electrical and electronic assemblies. It was KESTER 1544, a product of Kester Solder Division-Litton Industries, Des Plaines, Ill. Its approximate composition is 50% by weight modified rosin, 25% by weight ethanol, 25% by weight 2-butanol, and 1% by weight proprietary activator. The rosin flux was mixed with 0.05% by weight of non-reactive low viscosity silicone glycol flow-out additive. A uniform thin layer of the mixture was applied to a 2"×3" (5.1×7.6 cm) area of an aluminum panel and spread out evenly with the edge of a spatula. The coating was allowed to dry at room temperature (20°–25° C. /68°–77° F.) and cured at 100° C. for 10 minutes in an air oven. The panel was placed in a large magnetically stirred beaker filled one-third with azeotrope. Cleaning was conducted while rapidly stirring at room temperature even when cleaning with higher temperature azeotropes. The panel was removed at timed intervals, dried at room temperature, weighed, and re-immersed for additional cleaning. The initial coating weight and weight loss were measured as functions of cumulative cleaning time as shown in Table VII.

In Table VII, 1-butoxy-2-propanol is 1-BUTPRO; 1-(2-methoxy-1-methylethoxy)-2-propanol is 2-MMEPRO; 1-(2-ethoxy-1-methylethoxy)-2-propanol is 2-EMEPRO; 1-(2-propoxy-1-methylethoxy)-2-propanol is 2-PMEPRO; and 1-(2-methoxy-1-methylethoxy)-2-propanol-acetate is 2-MMEP-A. WT %. is weight percent of glycol ether or glycol ether acetate. TEMP is azeotropic temperature in °C. WT is initial weight of coating in grams. Time is cumulative time after 1, 5, 10, and 30 minute intervals. Composition 8 is a CONTROL of 100% by weight decamethyltetrasiloxane used for comparison. Table VII shows that our azeotropic compositions 1–7 were more effective cleaners than CONTROL 8. In fact, 100% MDDM did not remove any flux, but swelled the flux, as indicated by a negative weight loss.

TABLE VII

CLEANING EXTENT AT ROOM TEMPERATURE (22° C.)

| No | WT % | LIQUIDS | TEMP | WT (gm) | % REMOVED (Time/min) | | | |
|----|------|---------|------|---------|------|------|------|------|
|    |      |         |      |         | 1    | 5    | 10   | 30   |
| 1  | 85   | 1-BUTPRO | 170.4 | 0.3442 | 97.3 | 100  | —    | —    |
| 2  | 39   | 2-MMEPRO | 180.2 | 0.3433 | 96.1 | 99.9 | 100  | —    |
| 3  | 40   | 2-MMEPRO | 25.0  | 0.3468 | 97.3 | 100  | —    | —    |
| 4  | 16   | 2-EMEPRO | 25.0  | 0.3471 | 29.2 | 89.3 | 98.2 | 98.4 |
| 5  | 34   | 2-EMEPRO | 186.7 | 0.3465 | 66   | 100  | —    | —    |
| 6  | 9    | 2-PMEPRO | 193.8 | 0.3440 | 0.3  | 15   | 40.9 | 59.1 |
| 7  | 11   | 2-MMEP-A | 193.4 | 0.3421 | 0.3  | 15.1 | 41.2 | 59.5 |
| 8  | 0    | MDDM     | —     | 0.3452 | -1.8 | -1.9 | -1.6 | -1.3 |

Our azeotrope and azeotrope-like compositions have several advantages for cleaning, rinsing, or drying. They can be regenerated by distillation so performance of the cleaning mixture is restored after periods of use. Other performance factors affected by the compositions are bath life, cleaning speed, lack of flammability when one component is non-flammable, and lack of damage to sensitive parts. In vapor phase degreasing, the compositions can be restored by continuous distillation at atmospheric or reduced pressure, and continually recycled. In such applications, cleaning or rinsing can be conducted at the boiling point by plunging the part into the boiling liquid, or allowing the refluxing vapor to condense on the cold part. Alternatively, the part can be immersed in a cooler bath continually fed with fresh condensate, while dirty overflow liquid is returned to a sump. In the later case, the part is cleaned in a continually renewed liquid with maximum cleaning power.

When used in open systems, composition and performance remain constant even though evaporative losses occur. Such systems can be operated at room temperature as ambient cleaning baths or wipe-on-by-hand cleaners. Cleaning baths can also be operated at elevated temperatures but below their boiling point; since cleaning, rinsing, or drying, often occur faster at elevated temperature, and are desirable when the part being cleaned and equipment permit.

In manual cleaning operations, our azeotrope and azeotrope-like compositions may be applied by use of an aerosol spray directly on an article to be cleaned, or upon a fibrous or porous scrub brush or pad.

Our compositions are beneficial when used to rinse water displacement fluids from (i) mechanical and electrical parts such as gear boxes or electric motors, and (ii) other articles made of metal, ceramic, glass, and plastic, such as electronic and semiconductor parts; precision parts such as ball bearings; optical parts such as lenses, photographic, or camera parts; and military or space hardware such as precision guidance equipment used in defense and aerospace industries. Our compositions are effective as rinsing fluid, even though most water displacement fluids contain small amounts of one or more surfactants, and our compositions (i) more thoroughly remove residual surfactant on the part; (ii) reduce carry-over loss of rinse fluid; and (iii) increase the extent of water displacement.

Cleaning can be conducted by using a given azeotrope or azeotrope-like composition at or near its azeotropic temperature or at some other temperature. It can be used alone, or combined with small amounts of one or more organic liquid additives capable of enhancing oxidative stability, corrosion inhibition, or solvency. Oxidative stabilizers in amounts of about 0.05–5% by weight inhibit slow oxidation of organic compounds such as alcohols. Corrosion inhibitors in amounts of about 0.1–5% by weight prevent metal corrosion by traces of acids that may be present or slowly form in alcohols. Solvency enhancers in amounts of about 1–10% by weight increase solvency-power by adding a more powerful solvent.

These additives can mitigate undesired effects of glycol ether or glycol ether acetate components of our azeotrope and azeotrope-like composition, since they are not as resistant to oxidative degradation as the volatile methyl siloxane. Numerous additives are suitable, as the VMS is miscible with small amounts of many additives. The additive, however, must be one in which the resulting liquid mixture is homogeneous and single phased, and one that does not significantly affect the azeotrope or azeotrope-like character of the composition.

Useful oxidative stabilizers are phenols such as trimethylphenol, cyclohexylphenol, thymol, 2,6-di-t-butyl-4-methylphenol, butylhydroxyanisole, and isoeugenol; amines such as hexylamine, pentylamine, dipropylamine, diisopropylamine, diisobutylamine, triethylamine, tributylamine, pyridine, N-methylmorpholine, cyclohexylamine, 2,2,6,6-tetramethylpiperidine, and N,N'-diallyl-p-phenylenediamine; and triazoles such as benzotriazole, 2-(2'-hydroxy-5'-methylphenyl) benzotriazole, and chlorobenzotriazole.

Useful corrosion inhibitors are acetylenic alcohols such as 3-methyl-1-butyn-3-ol, and 3-methyl-1-pentyn-3-ol; epoxides such as glycidol, methyl glycidyl ether, allyl glycidyl ether, phenyl glycidyl ether, 1,2-butylene oxide, cyclohexene oxide, and epichlorohydrin; ethers such as dimethoxymethane, 1,2-dimethoxyethane, 1,4-dioxane, and 1,3,5-trioxane; unsaturated hydrocarbons such as hexene, heptene, octene, 2,4,4-trimethyl-1-pentene, pentadiene, octadiene, cyclohexene, and cyclopentene; olefin based alcohols such as allyl alcohol, and 1-butene-3-ol; and acrylic acid esters such as methyl acrylate, ethyl acrylate, and butyl acrylate.

Useful solvency enhancers are hydrocarbons such as pentane, isopentane, hexane, isohexane, and heptane; nitroalkanes such as nitromethane, nitroethane, and nitropropane; amines such as diethylamine, triethylamine, isopropylamine, butylamine, and isobutylamine; alcohols such as methanol, ethanol, n-propyl alcohol, isopropyl alcohol, n-butanol, and isobutanol; ethers such as methyl CELLOSOLVE®, tetrahydrofuran, and 1,4-dioxane; ketones such as acetone, methyl ethyl ketone, and methyl butyl ketone; and esters such as ethyl acetate, propyl acetate, and butyl acetate.

Other variations may be made in compounds, compositions, and methods described herein without departing from the essential features of our invention. The forms of our invention are exemplary only and not intended as limitations on its scope as defined in the appended claims.

We claim:

1. A composition consisting essentially of an azeotrope of about 2–15% by weight decamethyltetrasiloxane and about 85–98% by weight 1-butoxy-2-propanol, wherein the composition is homogenous and azeotropic at a temperature within the range of about 25°–180.7° C. inclusive, wherein the composition has a vapor pressure of about 1.2 Torr at 25° C. when the composition consists essentially of 2% by weight decamethyltetrasiloxane and 98% by weight 1-butoxy-2-propanol, and wherein the composition has a vapor pressure of about 1,000 Torr at 180.7° C. when the composition consists essentially of 15% by weight decamethyltetrasiloxane and 85% by weight 1-butoxy-2-propanol.

2. A method of cleaning, rinsing, or drying the surface of an article comprising applying to the surface an azeotropic composition defined in claim 1.

3. A composition consisting essentially of an azeotrope-like composition selected from the group consisting of:

(a) about 37–79% by weight decamethyltetrasiloxane and about 21–63% by weight 1-(2-methoxy-1-methylethoxy)-2-propanol, wherein the composition is homogenous and azeotrope-like at a temperature within one degree of 180.2° C. at 760 Torr; and (b) about 43–83% by weight decamethyltetrasiloxane and about 17–57% by weight 1-(2-ethoxy-1-methylethoxy)-2-propanol, wherein the composition is homogenous and azeotrope-like at a temperature within one degree of 186.7° C. at 760 Torr.

4. A method of cleaning, rinsing, or drying the surface of an article comprising applying to the surface an azeotrope-like composition defined in claim 3.

* * * * *